UNITED STATES PATENT OFFICE.

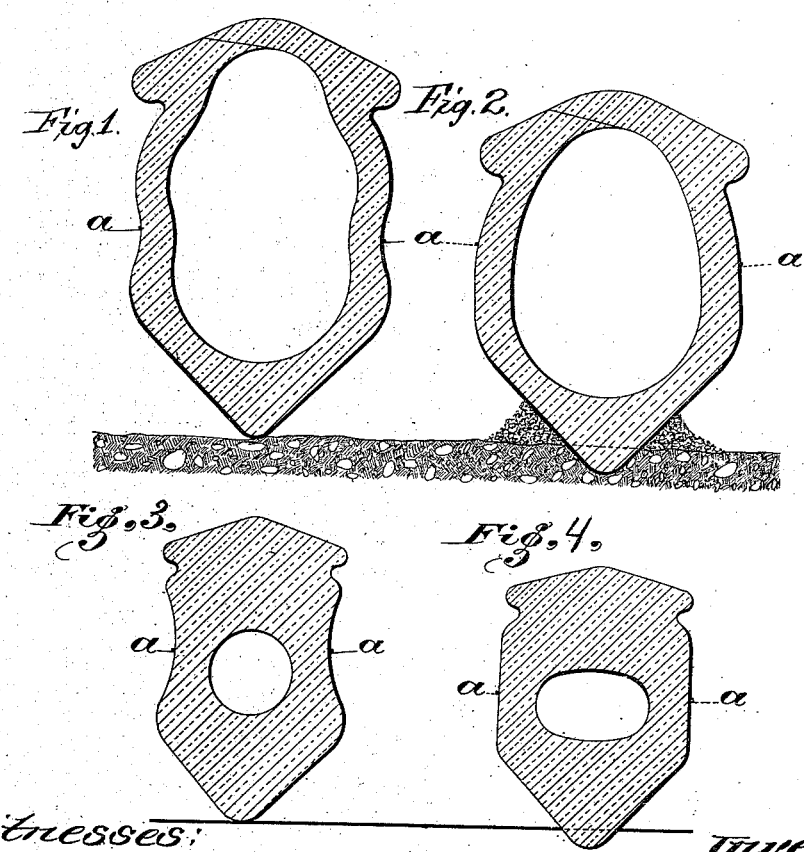

MAX POLACK, OF WALTERSHAUSEN, GERMANY.

TIRE FOR MOTOR-VEHICLES.

SPECIFICATION forming part of Letters Patent No. 716,099, dated December 16, 1902.

Application filed June 9, 1902. Serial No. 110,942. (No model.)

*To all whom it may concern:*

Be it known that I, MAX POLACK, manufacturer, a subject of the Duke of Saxe-Coburg-Gotha, residing at Waltershausen, in the Duchy of Saxe-Coburg-Gotha, in the German Empire, have invented certain new and useful Improvements in Tires for Motor-Vehicles, of which the following is a specification.

The pneumatic tires as used hitherto for motor-vehicles have the drawback that owing to the weight of the vehicle they become flattened, and thus offer a large surface in the contact with the road, whereby the friction of the tire on the road is considerably increased and the motion of the vehicle, particularly on a dusty or muddy road, is considerably lessened or requires extra driving power. Endeavors have been made to overcome this drawback by giving the tire on its outer periphery a somewhat-pointed shape, with the object of reducing the road-contact surface of the tire as much as possible. However, such tires become flattened under the weight which they support. The surface in contact with the road increases actually with the increase of the weight, as the tire becomes flattened and broader in spite of the pointed contact-surface. In order to overcome this drawback, the tire or outer cover receives, according to my present invention, a cross-section of such shape that it will not become flattened or widened by the weight supported, so that the contact-surface of the tire remains always practically constant or is only slightly increased by the weight carried. This effect is attained by forming the tire with a wedge-shaped outer portion on the side in contact with the road and with curved sides $a$, which under the influence of the weight applied are pressed outwardly without the outer part of the tire becoming flattened or broadened.

In describing the invention in detail reference is had to the accompanying drawings, forming a part of this specification, wherein like reference-characters denote corresponding parts throughout the several views, and in which—

Figure 1 shows a sectional elevation of a construction of a pneumatic tire or outer cover when not under pressure embodying my improvements, and Fig. 2 a like view when compressed. Fig. 3 shows a sectional elevation of a construction of a modified form of a cushion-tire or outer covering when not under pressure embodying my invention, and Fig. 4 a like view when compressed.

The tire being wedge-shaped at its periphery is provided laterally with one or more slightly inwardly curved portions $a$, which upon the inflating and "loading" of the tire, and therefore on decreasing or compressing the annular hollow space, in the first place move outwardly, so that the sides of the tire become almost straight, unlike the tires in which the air presses equally on all sides. Consequently the tire maintains its shape also when supporting a load, Fig. 2.

Owing to the fact that the running contact-surface of the tire is not increased the danger of side slip on wet roads or asphalt is prevented. While Figs. 1 and 2 represent a pneumatic tire or outer cover according to the present invention, Figs. 3 and 4 show an ordinary hollow or cushion tire formed according to this invention when not under a load and under a load, respectively, the sides $a$ slightly curved inward, as shown.

Having now particularly described and ascertained the nature of my said invention and in what manner the same is to be performed, I declare that what I claim is—

1. A vehicle-tire having a portion of its sides constructed slightly convexo-concave in contour, the outer face of said convexo-concave portion adapted to straighten when the tire is compressed.

2. A vehicle-tire having a wedge-shaped peripheral portion and its sides slightly curved, the outer face of said curved portion of the sides adapted to straighten when the tire is compressed.

In testimony whereof I have hereunto set my hand in presence of two subscribing witnesses.

MAX POLACK.

Witnesses:
WOLDEMAR HAUPT,
HENRY HASPER.